United States Patent Office 3,719,219
Patented Mar. 6, 1973

3,719,219
PNEUMATIC TIRE
Laszlo Horvath, Gusztav Gundisch, Mandor Antal, and Mihaly Arvai, Budapest, Hungary, assignors to Orazagos Gumiipari Vallalat, Budapest, Hungary
Filed Apr. 8, 1971, Ser. No. 132,302
Int. Cl. B60c 5/16
U.S. Cl. 152—379                                     10 Claims

ABSTRACT OF THE DISCLOSURE

A pneumatic tire formed of an elastomer and one or more fabric ply reinforcements, in which a fabric reinforcement extends continuously around the annular cross-section of the tire at an angle of between 70° and 90° relative to the crown thereof. The tire is fastened to an elastic or rigid member, which may be a wheel rim component, by an adhesive bond formed by a suitable adhesive.

---

Figure 1:
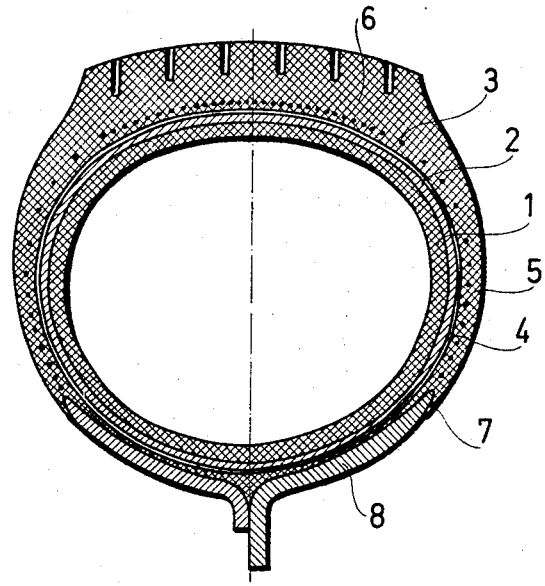

This invention relates to a pneumatic tire permanently attached to a wheel disc or rim.

Many different forms of construction of pneumatic tires for vehicles have already been proposed. The tires are made of an elastomeric material which is generally rubber, and the shape of the tires is substantially that of a split toroidal surface with beaded edges. The tires have a reinforcing carcass which consists of textile, glass or steel cord fabric insertions or plies in different angular positions, at least some of the plies being attached to the bead made of steel wires by turning the ends of the plies over the beads.

Rubber tires that have been built up in this way are mounted on divided or undivided wheel rims usually made of steel. The anchorage necessary for transmitting the forces is provided by friction when the tire is inflated with a gas, usually air, at a prescribed pressure. For the reception of the air a special inner tube may be provided, but more recently, particularly in the case of low pressure tires intended for passenger vehicles, no inner tube is present and the airtight seal is formed by an airtight layer inside the tire and a sealing form of construction of the bead.

Constructions have also been proposed in which the tread (protector) of the tire can be detached. This arranged is usually confined to so-called radial-ply tires in which the threads of the cord in the carcass extend at right angles or nearly at right angles to the beads. One common feature of these types of tire is that the tread is connected to the carcass by ribbing that prevents the tread from slipping off sideways. As a matter of experience, it is best to build up the tread from two or three separate rings. However, since these rings do not provide a satisfactory degree of lateral stability, padding layers of cord fabric cut on a bias angle of about 45° are incorporated in the radial plies.

Attempts have also been made to produce rubber tires without a reinforcing carcass, but in the present state of development of raw materials, such tires are not yet suitable for high loads and speeds.

It is a drawback of the rubber tires hitherto used and proposed that their production requires very complicated and expensive machines as well as highly skilled personnel. Moreover, when the life of tires made and used under like or similar conditions is compared it is found that there is a considerable degree of variation. This variation is principally due to the fact that, even under optimal conditions, it is impossible to produce the different types of tires, even under optimum manufacturing conditions, in such a way that a constant prescribed quantity is achieved. Another drawback is that it is difficult to mount the tires on the wheel rims and that the latter, particularly for the reception of large tires, are of complicated, expensive and heavy construction.

A solution for overcoming even some of these drawbacks would therefore very desirable close a gap in the development of pnuematic tires. The invention is based on the premise that if a tire were attached to the wheel with the aid of an adhesive it would be possible to eliminate the element which is the most difficult to produce in the making of a tire, namely the bead.

Accordingly the present invention provides a pneumatic rubber tire, wherein the tire is composed of an elastomer and one or more fabric ply reinforecements, and wherein a fabric reinforcement extends continuously around the annular cross-section of the pneumatic tire at an angle of 70 to 90° to the crown of the tire and is connected to an elastic or rigid member by adhesive bonding. The reinforcement is preferably of textile or glass fibre or steel cord fabric.

In the case of rubber tires of large width, the width would make it uneconomical to continue the reinforcement around the entire section, since this would involve an uneconomically high expenditure of valuable material. In this case, it is preferred to secure the cut ends of the reinforcing plies, without turning them over, by means of a suitable bonding adhesive to an elastic or rigid ring-shaped member which may be the wheel disc or a part thereof, such as the rim or a separate ring which can be adhesively bonded to the wheel disc or rim. This arrangement likewise permits the use of wire beads which are of complicated construction and constitute an inhomogeneity in the tire, to be dispensed with. The present tire is still substantially built up in conventional manner, but there is no tie-in of beads. Instead, the ends of the reinforcing plies, before or after being cambered, are bonded to the wheel disc or rim with a suitable adhesive, which for steel cord is preferably an epoxy resin filled with short cut fibres.

The tread of the present tire may be contrived in several different ways. In one arrangement, the tread may be reinforced with plies of cord at an angle running in or deviating not more than 20° from the direction of the crown, substantially as is already conventional. In an alternative arrangement the tread, consisting of a suitable elastomer, may be injection-moulded to the carcass, and in yet another arrangement the tread, likewise reinforced with cord plies running in or at an angle not exceeding 20° to the direction of the crown may be detachably or replaceably mounted. The rubber tire may be constructed of three parts, the tread, with or without a reinforcement, being detachably mounted on the carcass.

Figure 2:
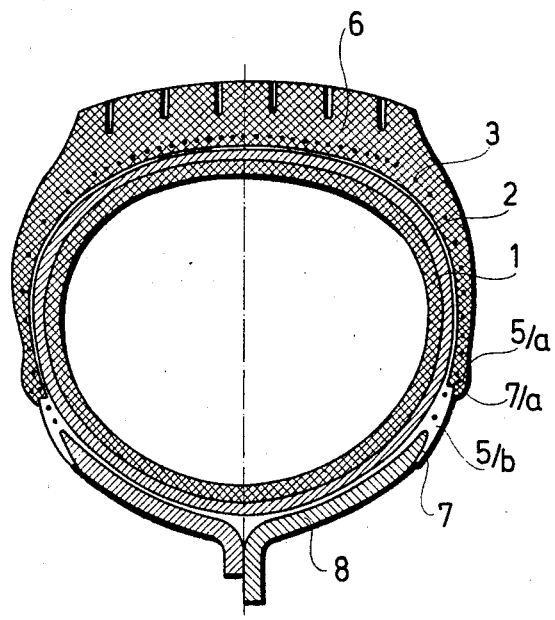
Figure 3:
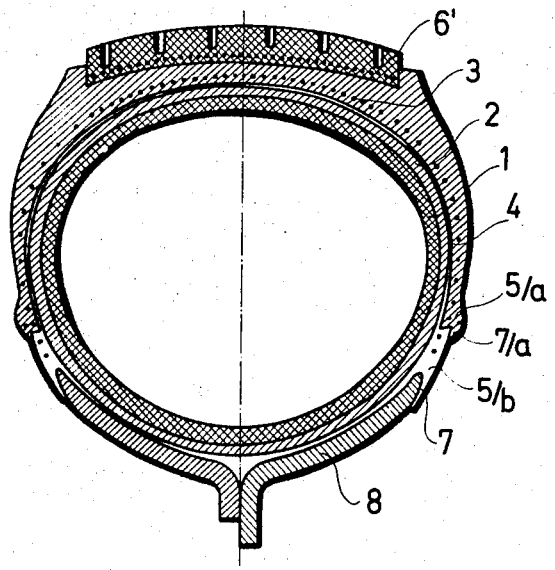
Figure 4:
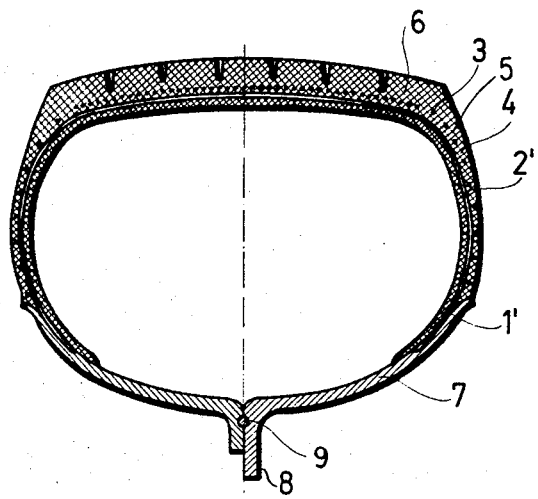
Figure 5:
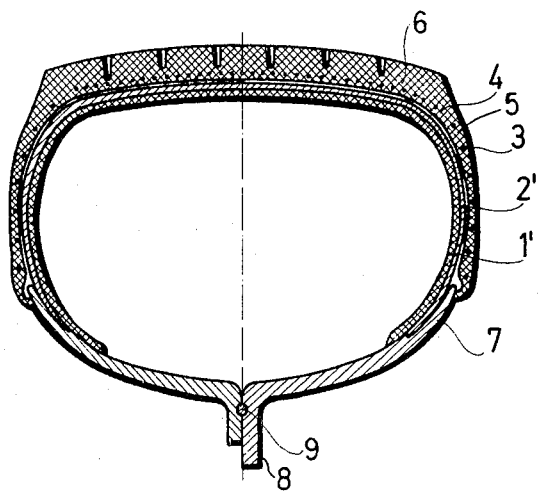
Figure 6:
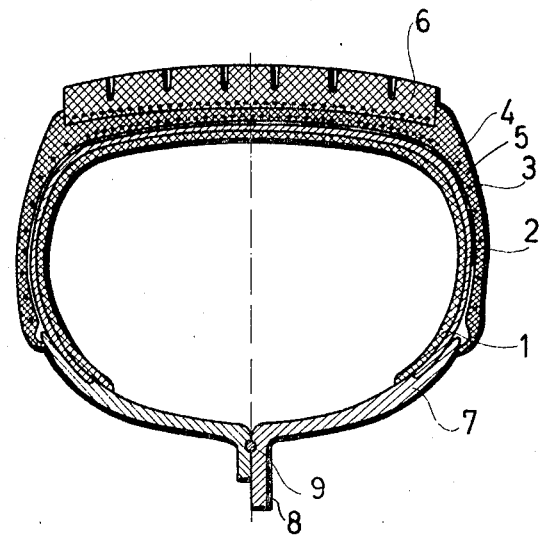
Figure 7:
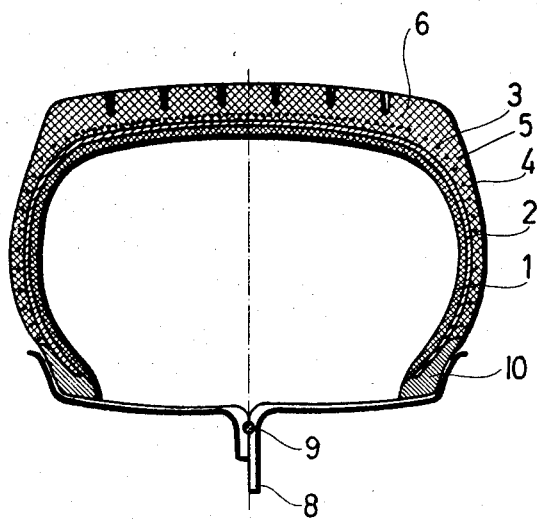

In order to enable the invention to be more readily understood, reference will now be made to the accompanying drawings, which illustrate diagrammatically and by way of example some embodiments thereof, and in which:

FIGS. 1 to 3 are cross-sections of single, two and three part rubber tires respectively, the tires being provided with continuous reinforcing plies, FIGS. 4 to 6 are cross-sections of single, two and three part tires respectively, the tires containing folded plies lacking a bead, and FIG. 7 is a cross-section of a rubber tire provided with adhesively bonded rings.

Referring now to FIG. 1, there is shown a tire in which an airtight layer 1 is embraced by a fabric 2 comprising one or more threads, the fabric 2 being inserted perpendicularly to the line of the crown or at an angle thereto not exceeding 20°, i.e., at 70 to 90° to the line of the crown. The material used for the fabric insertion may be any fibre material possessing the necessary strength, and glass cord or steel cord fabric has proved to be appropriate. Types of cord fabric based on the same basic materials may be used for a further fabric insertion 3 which runs in the direction of the crown or at an angle thereto not exceeding 20°. A rubber layer 4 is provided between the two insertions 2 and 3 and is extended to form the tread 6 and the side-walls 5 of the tire, the radially inner end of the side-wall 5 forming a lip 7.

The wheel disc and rim 8 are preferably of two-part construction because this simplifies manufacture and the the ply 2 can be bonded thereto with an adhesive. The lip 7 which serves as a seal is similarly attached to the wheel disc or rim 8 by adhesive bonding. If a steel cord fabric is used a conventional metal adhesive, such as an epoxy resin will be suitable, and for heavy loads and high speeds this method should always be employed. In the case of tires for lighter loads and slower speeds the arrangement according to FIG. 1 can be modified by tucking in the side-wall 5 between the wheel disc or rim 8 and the ply 2, and in such a case a conventional rubber-to-textile or a metal-to-rubber adhesive may be used.

The embodiment shown in FIG. 2 is similar to that shown in FIG. 1, except that the tread 6 and the rubber side-walls 5 consist of an elastomer applied to the tire carcass by injection moulding. The described form of construction enables this technique to be used because the prepared carcass without the elastomeric parts 5 and 6 is subjected to pressure during manufacture when the space between the mould and the carcass can be filled by injection moulding.

In the embodiment shown in FIG. 2, the design and purpose of the components 1 to 8 differ from those of the embodiment described with reference to FIG. 1 in so far as the side-wall is divided into two parts 5a and 5b and that radially outer portion consisting of the parts 3, 5a and 6 can be lifted off the carcass when this is not pressurised.

The detachable portion is connected to the carcass by a small overlap 7a which serves the purpose of providing protection against the ingress of dirt. This overlap 7a may also be attached to the carcass by means of an adhesive bond in order to improve the seal.

The embodiment shown in FIG. 3, is similar to that shown in FIG. 2, except that the tread 6' can be lifted off the foundation structure.

The tires just described are initially constructed in the same way. The airtight layer 1 is mounted on an air bag and the fabric 2 is then applied. This has a free end only where it begins and where it ends and otherwise runs without interruption over the annular surface. The beginning and end are conveniently so disposed when the reinforcement is adhesively bonded to the wheel disc or rim that they are covered by the disc or rim. The surface of the fabric reinforcement 2 is covered with a layer of rubber 4. The lengths are cut off to size, made endless and the conventional valve, not shown in the drawing is fitted. The surfaces of the wheel disc or rim 8 and of the reinforcement 2, and possibly also the layer of elastomer that is placed over the wheel disc or rim 8, are prepared for bonding in conventional manner, and the two prepared components are then assembled. The two halves of the wheel disc or rim 8 are finally joined together by adhesive bonding, riveting or bolting.

The components 3, 5a and 6 of the assembly may also be applied to the pumped-up carcass, or alternatively they may be assembled on a separate assembly drum.

In the embodiment illustrated in FIG. 4, the airtight layer 1' is surrounded by a cord ply reinforcement 2'. This cord ply 2' runs at right angles to the crown or at an angle deviating therefrom by not more than 20°. The material may be any desired fibre material having the necessary strength, and is preferably a glass cord or a steel cord fabric. A further ply 3 made of cord grades based upon the same materials can be provided in the direction of the tire crown or at an angle deviating therefrom by not more than 20°.

On the outside of the reinforcing insertions are the rubber layer 4 constituting part of the side-wall 5 and a tread 6. A sealing ring 9 provides a tight seal between the two halves of the wheel disc or rim 8. In this case, the airtight layer 1' forming an inside tube and the rubber of the side-wall are attached to the rim 8 by a metal-to-rubber bond. The plies are likewise adhesively bonded, in the case of steel cord by using an epoxy-based adhesive preferably filled with a cut fibre material.

The embodiment shown in FIG. 5 differs from that in FIG. 4 in regard to the construction and purpose of the components 1 to 8 in so far as the upper portion comprising the tread 6, the ply 3 and the side-wall rubber 5 can be bodily lifted off the carcass provided there is no internal pressure.

In the embodiment of FIG. 6, the tread can be lifted off the carcass, the remainder of the tire being the same as shown in FIG. 5.

In the embodiment shown in FIG. 7, the reinforcing plies are secured to a ring 10 consisting of an elastic or rigid material, the ring being secured to the rim by frictional contact although it could be attached otherwise than shown in the drawing, for instance by bolts. In this case, another form of rim 8 is shown.

In another embodiment the tread and the side-wall rubber may consist of a suitable elastomer that has been injection moulded to the carcass. Injection moulding may be performed for instance by locating a divided removable core inside the tire.

With the present tire, wire beads and the consequent inhomogeneity in the structure are eliminated, so that construction is simpler and the overall weight less. Free ply ends which lead to an early destruction of the rubber structure are absent. Furthermore, in a conventional rubber tire, the multiplication of plies is limited by the permissible size of the bead, but in the absence of a bead this limitation ceases to exist.

Each individual component of the present tire can be dimensioned to conform with the load, i.e. the strengths of the side-walls and of the crown of the tread can be independently varied in both the lengthwise and crosswise directions. If desired, replaceable treads can be provided.

The present construction ensures airtightness even in the absence of an inner tube and will in general be unaffected by damage done to the wheel disc or rim.

The present rubber tire together with the wheel disc and/or rim can be simply bolted to a hub, and the present tire is better suited than conventional tires for high speeds and heavy weights.

From the point of view of vehicle design, it is an advantage that the brake drum can be of substantially larger diameter when the present tires are fitted than when conventional tires are fitted.

What is claimed is:

1. A pneumatic rubber tire, wherein the tire is composed of an elastomer and one or more fabric ply reinforcements, and wherein a fabric reinforcement extends continuously around the annular cross-section of the pneumatic tire at an angle of 70 to 90° to the crown of the tire and is connected to an elastic or rigid member by adhesive bonding.

2. A rubber tire as claimed in claim 1, wherein a reinforcement supporting the side-walls of the pneumatic tire is adhesively bonded to an elastic or rigid member.

3. A rubber tire as claimed in claim 2, wherein the rigid member is a wheel disc or rim or a part thereof.

4. A rubber tire as claimed in claim 2, wherein the elastic or rigid member is a ring for securing to a wheel disc or rim.

5. A rubber tire as claimed in claim 4, wherein the ring is adhesively bonded to the wheel disc or rim.

6. A rubber tire as claimed in claim 4, wherein the tire has a tread and rubber side-walls constructed as a unit that is detachable from the carcass of the tire when this is not pumped up.

7. A rubber tire as claimed in claim 4, wherein the beginning and end of the reinforcement are covered by the wheel disc or rim.

8. A rubber tire as claimed in claim 4, wherein the tire has divided side-walls attached in the dividing plane to the carcass by an adhesively bonded or unbonded lip.

9. A rubber tire as claimed in claim 3, wherein an outer and an inner layer of rubber are attached to the wheel disc or rim by a metal-to-rubber bond.

10. A rubber tire as claimed in claim 1, wherein the tire has a detachable tread.

References Cited

UNITED STATES PATENTS

| 3,106,951 | 10/1963 | Hurdel | 152—379 |
| 2,854,052 | 9/1958 | Smith et al. | 152—378 |

FOREIGN PATENTS

| 29,754 | 12/1896 | Great Britain | 152—379 |
| 513,117 | 8/1952 | Belgium | 152—379 |

JAMES B. MARBERT, Primary Examiner

U.S. Cl. X.R.

152—152